US009067276B2

(12) United States Patent
Koppitz et al.

(10) Patent No.: US 9,067,276 B2
(45) Date of Patent: Jun. 30, 2015

(54) METHOD FOR NON-RELEASABLE FIXING OF ONE COMPONENT TO A FURTHER COMPONENT

(75) Inventors: Bernd Koppitz, Winterbach (DE); Rudolf Reinhardt, Esslingen (DE); Tobias Schuster, Esslingen (DE); Heiko Steinmetz, Ohmden (DE); Bernhard Ziegler, Rechberghausen (DE)

(73) Assignee: Daimler AG, Stuttgart (DE)

( * ) Notice: Subject to any disclaimer, the term of this patent is extended or adjusted under 35 U.S.C. 154(b) by 144 days.

(21) Appl. No.: 13/576,727

(22) PCT Filed: Dec. 9, 2010

(86) PCT No.: PCT/EP2010/007513
§ 371 (c)(1),
(2), (4) Date: Sep. 12, 2012

(87) PCT Pub. No.: WO2011/095191
PCT Pub. Date: Aug. 11, 2011

(65) Prior Publication Data
US 2012/0328360 A1    Dec. 27, 2012

(30) Foreign Application Priority Data

Feb. 3, 2010   (DE) .......................... 10 2010 006 670

(51) Int. Cl.
*B21J 15/02*   (2006.01)
*B23K 11/14*   (2006.01)
(Continued)

(52) U.S. Cl.
CPC ........... *B23K 11/14* (2013.01); *Y10T 29/49865* (2015.01); *Y10T 403/471* (2015.01);
(Continued)

(58) Field of Classification Search
CPC ............ B21J 15/08; F16B 5/04; F16B 19/06; B23P 11/025; Y10T 29/49776; Y10T 29/499943; Y10T 29/49956
USPC ...................... 29/525.06, 525.14, 447, 524.1; 411/171, 501, 504
See application file for complete search history.

(56) References Cited

U.S. PATENT DOCUMENTS 5,035,041 A * 7/1991 Matuschek .................... 29/509
8,595,914 B2   12/2013 Koppitz et al.
(Continued)

FOREIGN PATENT DOCUMENTS

CN           101277779 A    10/2008
DE   10 2006 028 771 A1    1/2008
(Continued)

OTHER PUBLICATIONS

Japanese Office Action dated Dec. 4, 2013 (two (2) pages).
(Continued)

*Primary Examiner* — Jermie Cozart
(74) *Attorney, Agent, or Firm* — Crowell & Moring LLP

(57) ABSTRACT

A method for non-releasable fixing of at least one component to a further component is provided in which a hot rivet is introduced into an opening of the at least one first component and an end face of a shank of the hot rivet is welded to a surface of the further component. Subsequently, with plastic deformation of the hot rivet, the shank of the hot rivet is compressed until a head of the hot rivet lies with a pre-stressing force at least in areas on a surface of the at least one component. The pre-stressing force, with which the head of the hot rivet lies at least in areas on the surface of the at least one component, is adjusted to a predefined value.

1 Claim, 4 Drawing Sheets

Figure 1:
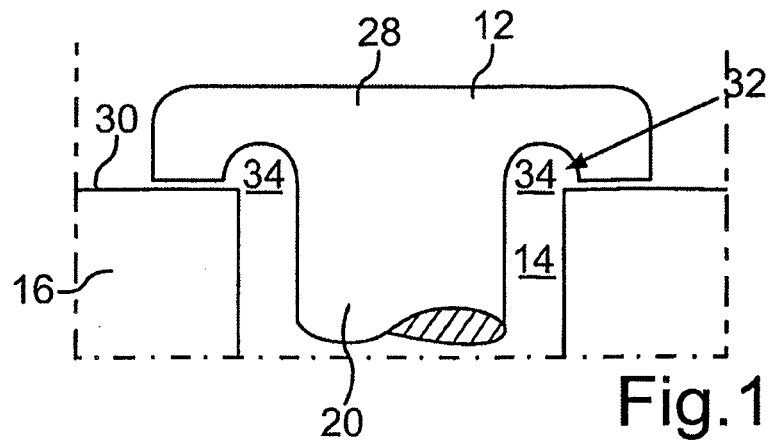

(51) Int. Cl.
  *B21J 15/08* (2006.01)
  *B23K 9/20* (2006.01)
  *B23K 11/00* (2006.01)
  *B23K 35/02* (2006.01)

(52) U.S. Cl.
  CPC ........... *B21J 15/08* (2013.01); *Y10T 29/49776* (2015.01); *Y10T 29/49943* (2015.01); *Y10T 29/49956* (2015.01); *B23K 9/207* (2013.01); *B23K 11/0066* (2013.01); *B23K 35/0288* (2013.01); *B23K 2201/006* (2013.01)

(56) References Cited

U.S. PATENT DOCUMENTS

| | | |
|---|---|---|
| 2008/0229570 A1 | 9/2008 | Koppitz et al. |
| 2009/0139821 A1 | 6/2009 | Koppitz et al. |
| 2009/0261075 A1 | 10/2009 | Aoyama et al. |
| 2011/0097142 A1 | 4/2011 | Bassler et al. |

FOREIGN PATENT DOCUMENTS

| | | |
|---|---|---|
| JP | 2008-538232 A | 10/2008 |
| JP | 2009-541668 A | 11/2009 |
| JP | 2011-519727 A | 7/2011 |
| WO | WO 2006/084609 A1 | 8/2006 |
| WO | WO 2009/135553 A1 | 11/2009 |

OTHER PUBLICATIONS

International Search Report with English translation dated Apr. 12, 2011 (four (4) pages).
Form PCT/ISA/237 (seven (7) pages).
Chinese Office Action dated Apr. 1, 2014 with English Translation (four-teen (14) pages).

* cited by examiner

METHOD FOR NON-RELEASABLE FIXING OF ONE COMPONENT TO A FURTHER COMPONENT

BACKGROUND AND SUMMARY OF THE INVENTION

The invention relates to a method for non-releasable fixing of at least one component to a further component and to hot rivet joints.

German Patent Document No. DE 10 2006 028 771 A2 discloses a hot rivet joint and a method for production thereof. During hot riveting a hot rivet is introduced into an opening of a component and welded via an end face of a shank of the hot rivet to a surface of a further component. This can be achieved through resistance welding, in particular through projection welding. The shank of the hot rivet is then heat compressed, with plastic deformation of the hot rivet, until a head of the hot rivet lies at least in areas on a surface of the first component. During compression, material of the shank is laterally displaced and fills at least some areas of the opening of the first component. A pre-stressing force that fixes the components against each other is produced between the two components.

The pre-stressing force cannot be adjusted, however, in known hot riveting methods. In association with additional operating forces, however, excessive pre-stressing force can lead to overloading and failure of the hot rivet joint.

Accordingly, exemplary embodiments of the present invention are directed to a method and a hot rivet joint in which a predefined pre-stressing force can be adjusted between the components to be joined.

In a method for non-releasable fixing of at least one component to a further component a hot rivet is introduced into an opening of the at least one first component and an end face of a shank of the hot rivet is welded to a surface of the further component. Subsequently, with plastic deformation of the hot rivet, the shank of the hot rivet is compressed until a head of the hot rivet lies with a pre-stressing force at least in areas on a surface of the at least one component.

According to exemplary embodiments of the present invention the pre-stressing force, with which the head of the hot rivet lies at least in areas on the surface of the at least one component, is adjusted to a predefined value. Thus, a hot rivet joint can be created that is designed so that the total of the pre-stressing force and loads of the hot rivet joint arising in operation always remains below a maximum force. A failure of the hot rivet joint under operating loads is thus reliably avoided.

In order to adjust the pre-stressing force suitable hot rivets are thereby selected according to the operating load to be expected. An essential factor here is the elasticity between the rivet head or the bearing of the rivet head and the shank of the hot rivet. In order to reduce the pre-stressing force, for example, a rivet with a recess in the form of a hollow channeling between the shank and the head can be selected. The selection of a hot rivet with suitable head thickness and/or a suitable leverage ratio between the shank and head bearing surface on the at least one component can serve for adjusting the pre-stressing force.

A further possibility for adjusting the pre-stressing force lies in the selection of a hot rivet with a suitably designed shank. For example, rivets with purposefully limited heat compressible areas can be selected. Such rivets have a geometric diameter graduation. Only the shank length portion with the smallest cross-section is compressed during the hot riveting. The contraction of the rivet shank during cooling is limited to the heated region, whereby the pre-stressing force thereby arising is then reduced.

The pre-stressing force can also be adjusted through the design of the receiving opening for the hot rivet. In this connection, for example, undercuts can be provided that act as purposefully selected elasticities.

A further possibility for selecting the pre-stressing force lies in the adjustment of the process parameters during welding or compression of the hot rivet. With increasing electrode force between an electrode used for welding or heat compression the compression takes place at a lower rivet shank temperature. Due to the low resulting contraction of the compressed rivet a lower pre-stressing force is achieved. The amount of heat applied during the hot riveting can also be used to adjust the pre-stressing force. By combining a rivet flow value and a riveting-in time the amount of heat can be controlled. Smaller amounts of heat lead to lower pre-stressing force, large amounts of heat to higher pre-stressing forces.

The invention further relates to a hot rivet joint for non-releasable fixing of at least one component to a further component. The hot rivet joint comprises a hot rivet with a head and a shank connecting thereto, of which the end face facing away from the head is welded to a surface of the further component, wherein the shank of the hot rivet is compressed under plastic deformation. According to exemplary embodiments of the invention, a recess is provided in the transition region between the head and the shank, by means of which a pre-stressing force for at least area-wise bearing of the head on a surface of the at least one component can be adjusted to a predefined value. Through such a recess, which can, for example, be in the form of peripheral channeling surrounding the connection region between the head and the shank, the elasticity of the hot rivet is increased so that the hot rivet joint all in all has a low pre-stressing force.

The further aspects of the invention described below can be used either independently or also in combination.

A further aspect of the invention relates to a hot rivet joint of the type described, in which according to the invention the thickness of the head of the hot rivet is designed for adjustment of a pre-stressing force for the at least area-wise bearing of the head on a surface of the at least one component to a predefined value. Hot rivets with a small head thickness hereby lead to a lower pre-stressing force, as also here the elasticity in the transition region between the head and shank of the hot rivet is increased.

An adjustment of the pre-stressing force to predefined values is also possible so that overloading of the rivet joint through the pre-stressing force in connection with the operating load is avoided.

In a further aspect of the invention a ratio of a bearing surface of the head on a surface of the at least one component to a cross-sectional area of the shank is provided by means of which a pre-stressing force for at least area-wise bearing of the head on a surface of the at least one component can be adjusted to a predefined value. This leverage ratio determines the rigidities of the rivet and therefore directly influences the pre-stressing force so that here also overloading is reliably avoided by selecting a suitable leverage ratio.

A further aspect of the invention relates to a hot rivet joint of the type described, in which according to the invention the shank of the hot rivet comprises a first and a second length region, whereby merely one of the two length regions of the shank is compressed under plastic deformation. This can be realised by selecting a hot rivet with two length regions of different cross-sections, whereby during compression of the hot rivet merely the region with the smaller cross-section undergoes compression. The length region which has not been heated only contributes insignificantly to the pre-stressing force due to the lack of contraction during cooling so that the pre-stressing force can be adjusted by selecting the ratio between the first and second length region in order to also avoid overloading the rivet joint through excessive tensile forces in the rivet joint.

A further aspect of the invention relates to a further hot rivet joint of the type described, in which according to the invention the at least one first component comprises an undercut that cooperates with a plastically deformed region of the shank. A part of the shank of the hot rivet is supported through the undercut so that merely the region between the undercut and the head of the hot rivet contributes to the pre-stressing force. By selecting the position of the undercut the precise adjustment of the pre-stressing force to the desired value is also possible here in order to thus avoid overloading of the rivet joint.

A further aspect of the invention relates to a further hot rivet joint of the type described, in which an opening in the at least one component comprises a widened area. It is also possible through the selection of the width and height of this widened area to adjust the pre-stressing force to a desired value.

A further aspect of the invention relates to a further hot rivet joint of the type described, in which the lower component comprises a thickness reduction on a surface facing away from the shank of the rivet. A targeted adjustment of the pre-stressing force can likewise be achieved through the selection of the size and height of this thickness reduction.

A further aspect of the invention relates to a further hot rivet joint of the type described, in which the lower side of the head is designed in an umbrella shape so that the head contacts the component only in an outer region. In this way the ratio of the inner diameter of the contact surface between the head and component is enlarged and the pre-stressing force is thus indirectly influenced.

BRIEF DESCRIPTION OF THE DRAWING FIGURES

Figure 5:
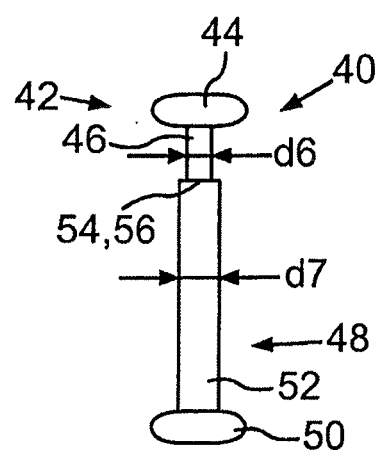
Figure 6:
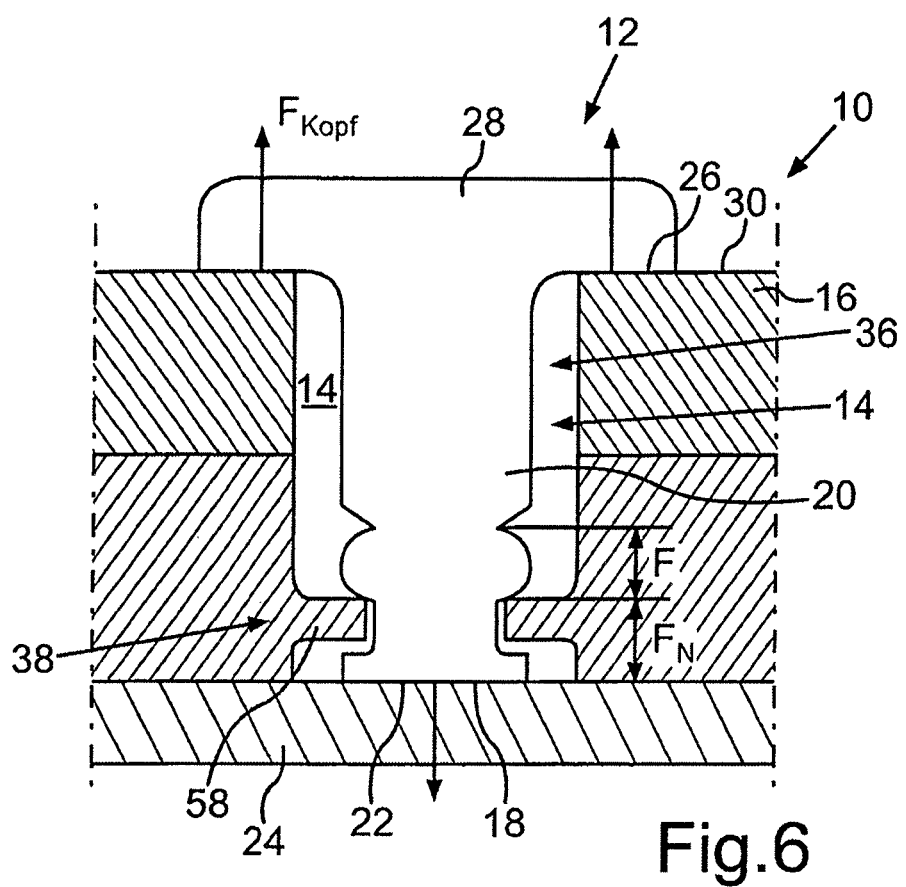
Figure 7:
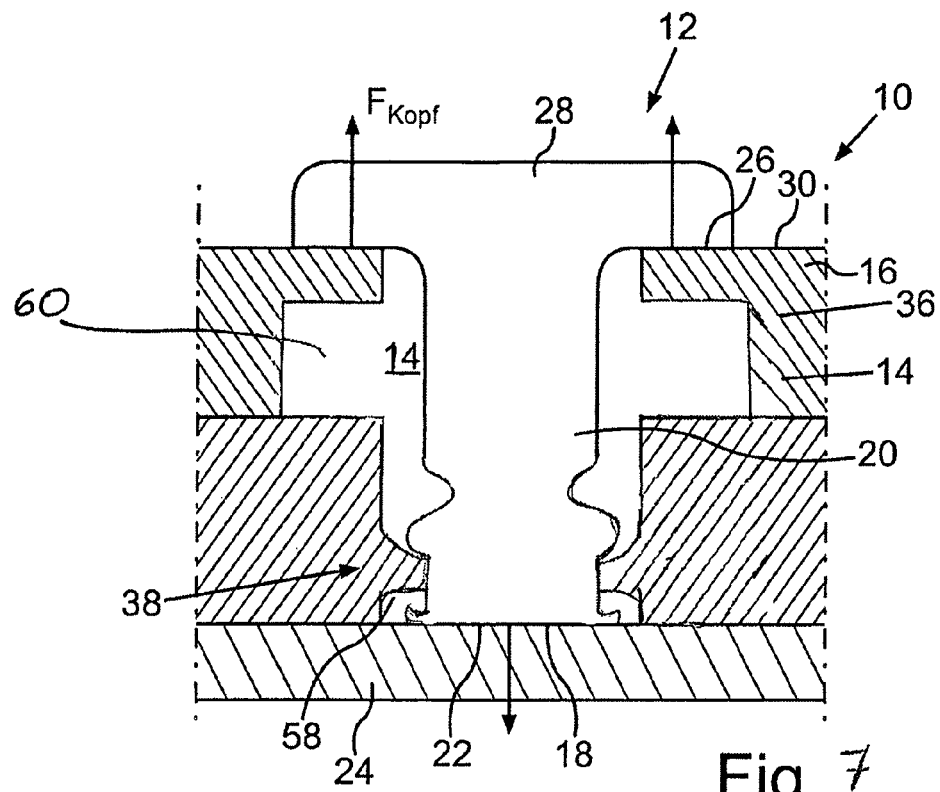
Figure 8:
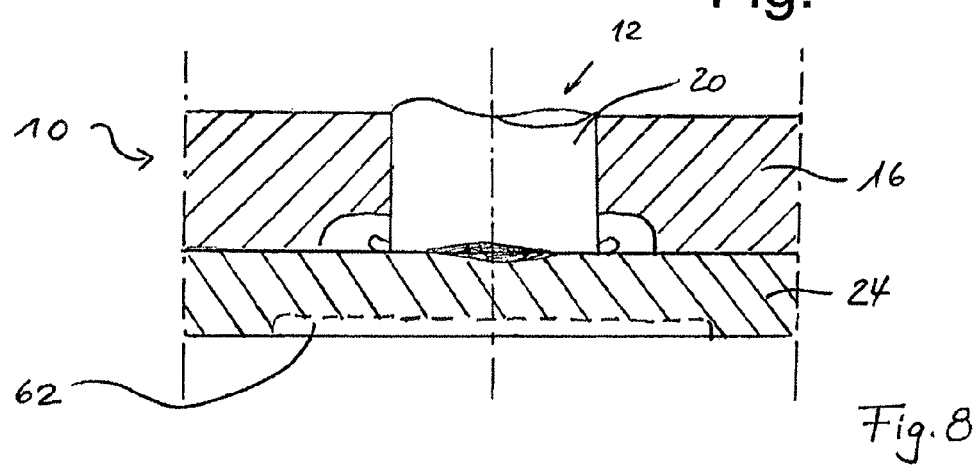
Figure 9:
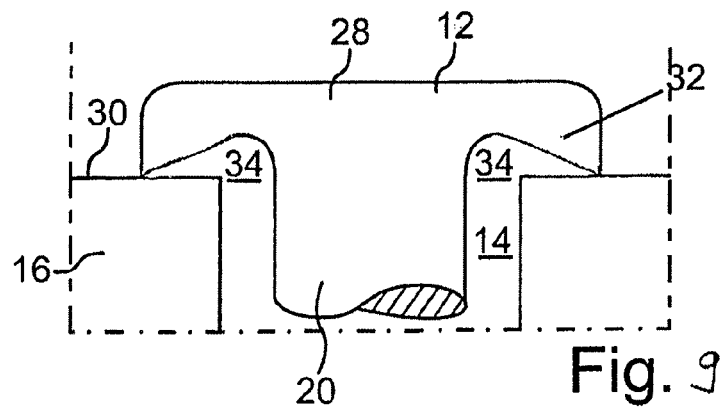

The invention and the embodiments are to be explained in further detail below by reference to the drawings, in which:

FIGS. 1 to 5 show alternative embodiments of rivets as examples of inventive hot rivet joints, FIGS. 6 to 8 show three example embodiments of an inventive hot rivet joint, and FIG. 9 a further embodiment of a rivet for a hot rivet joint according to the invention.

DETAILED DESCRIPTION

In a hot rivet joint designated in its entirety by the reference numeral 10 a hot rivet 12 is fed through an opening 14 of a component 16 and an end face 18 of a shank 20 of the hot rivet 12 is welded to a surface 22 of a further component 24. The shank 20 is then heat compressed so that an area 26 of a head 28 of the hot rivet 12 lies on a surface 30 of the component 16. Through the contraction of the hot rivet 12 after the compression carried out in the hot state a pre-stressing force is produced between the components 16 and 24. If this is too high the hot rivet joint 10 can fail under an additional operating load.

A possibility for reducing the pre-stressing force is the use of a rivet 12 shown in FIG. 1, which comprises a recess 34 in the form of a peripherally surrounding hollow channeling in a transition region 32 between the head 28 and the shank 20. The head thickness is reduced through the recess 34 and therefore the elasticity in the transition region 32 between the head 28 and shank 20 is increased, so that the hot rivet 12 can yield after the heat compression, whereby this reduces the pre-stressing force between the components 16 and 24. In this embodiment the head 28 is thus deliberately weakened. This design of the hot rivet joint 10 is to be preferred particularly when the diameter of the opening 14 is constructively fixed and can no longer be influenced. The pre-stressing force can then still be influenced via the recess 34.

Figure 2:
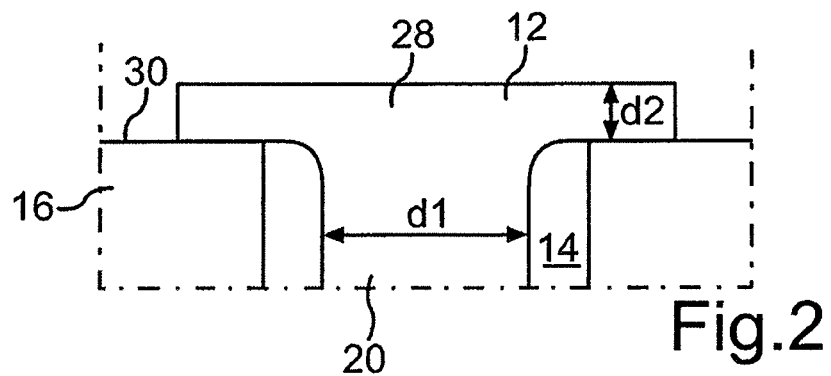

As shown in FIG. 2, the pre-stressing force can also be adjusted through the ratio of the shank thickness d1 to the head thickness d2. The smaller the head thickness d2 the greater the flexibility in the transition region between the head 28 and shank 20 of the hot rivet 12. This design of the hot rivet joint 10 is particularly useful when for constructive reasons a particularly thin or flat head 28 is to be selected.

Figure 3:
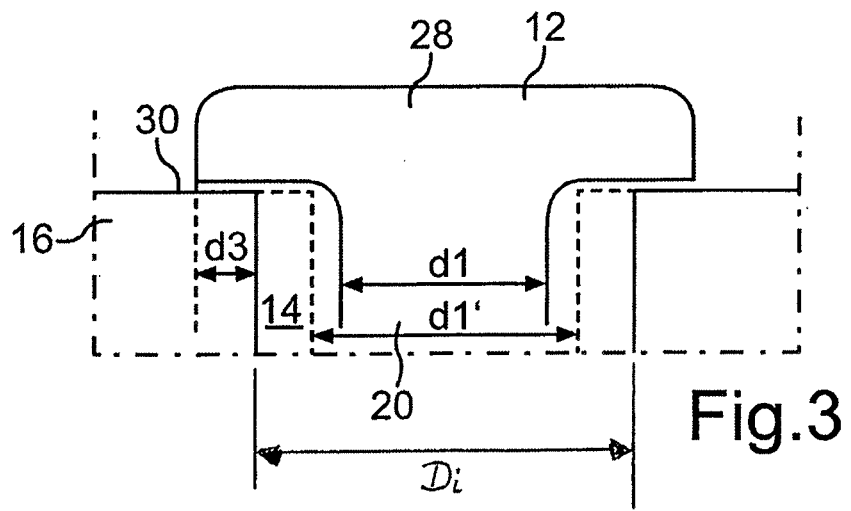
Figure 4:
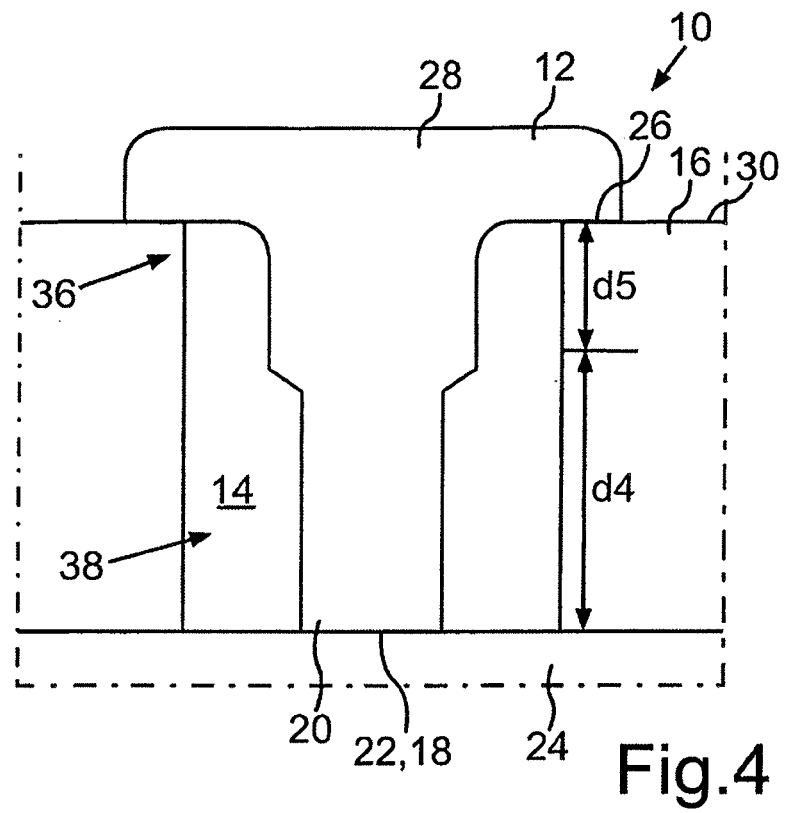

As shown in FIG. 3, the ratio between the shank thickness d1 and the inner diameter $D_i$ of the bearing surface of the head 28 on the surface 30 of the component 16 offers a further possibility for adjusting the pre-stressing force. A larger inner diameter $D_i$ in relation to the shank thickness d1 changes, in comparison with a smaller inner diameter $D_i$ with the same shank thickness d1, the leverage ratio between the head 28 and shank 20 and thus also the pre-stressing force.

Also the design of the shank 20 itself can be used for adjusting the pre-stressing force. In the embodiment shown in FIG. 4 the shank 20 of the hot rivet 12 is divided into a first sub-region 36 and a second sub-region 38, whereby the second sub-region 38 has a smaller diameter than the first sub-region 36. During compression of the hot rivet 12 merely the second sub-region 38 is compressed and the first, thicker sub-region 36 remains unchanged. The ratio of the lengths d4 and d5 of the two sub-regions 38, 36 determines the compressed portion of the shank 20. The shorter the compressed portion, thus the length d4 of the sub-region 38, the lower also the contraction during cooling of the rivet 12 after compression and the lower the pre-stressing force.

This can also be achieved through a two-part rivet 40, as shown in FIG. 5. A first rivet part 42 comprises a head 44 and a shank 46 with diameter d6, a second rivet part 48 comprises a head 50 and a shank 52 with diameter d7. The diameter d7 with the rivet part 48 is greater than the diameter d6 of the first rivet part 42. The two rivet parts are welded in the receiving opening of the components to be riveted via the end faces 54, 56 of their shanks 46, 52. During the subsequent compression merely the shank 46 of the first rivet part is compressed, as this has the smaller diameter. The pre-stressing force of the rivet joint 10 can also be regulated here by means of the ratio of the shank lengths 46, 52.

Alternatively or additionally the design of the receiving opening 14 can also have effects upon the pre-stressing force of the rivet joint 10, as shown in FIG. 6. The receiving opening 14 for the rivet 12 comprises an undercut 58 here. At the same time the shank 20 of the rivet is also formed in two parts, i.e., divided into two regions, and comprises a first region 36 with a larger diameter and a second region 38 with a smaller diameter. Compression only takes place in the second sub-region 38, whereby the second sub-region 38 is adapted in its contour to the undercut 58. The undercut 58 supports the shank 20 of the rivet 12 in the contraction so that a part of the pre-stressing force can be maintained by the undercut 58. This reduces the pre-stressing force $F_{kopf}$ acting in total on the head so that overloading of the rivet joint can also be avoided here. At the same time a sealing function between the rivet 12 and component 24 is achieved through the stress in the compressed part.

FIG. 7 shows an alternative embodiment of the hot rivet joint. By way of a deviation from the embodiment shown in FIG. 6 the receiving opening 14 in the component 16 is enlarged area-wise here 16 through a widened area 60. This widened area 60 acts as an additional elasticity in the hot rivet joint 10. The pre-stressing force can be purposefully influenced by means of the precise design of this widened area 60, thus the height and width thereof.

FIG. 8 shows a further possibility, with which additional elasticity can be incorporated into the hot rivet joint 10. The component 24, to which the shank 20 is welded, is thereby provided with a thickness reduction 62 in the region of the hot rivet joint 10. This thickness reduction 62 can, as shown in this example, be designed in the form of an impressed area on the surface of the component 24 facing away from the component 16. Alternatively this thickness reduction 62 can also be arranged on the other surface of the component 24 facing the component 16. Through the reduction or variation thereby achieved in the thickness of the component 24 in the region of the hot rivet joint 10 the pre-stressing force can be purposefully influenced.

FIG. 9 shows an umbrella-shaped design of the lower side of the rivet head 28. It is thereby ensured that the bearing surface of the rivet head 28 on the component 16 is displaced outwards in the radial direction from the opening 14. The ratio of the inner diameter $D_i$ of the bearing surface to the diameter d1 of the shank 20 is thereby increased. This influences or reduces, as already described above, the pre-stressing force.

Obviously the hot rivet joint 10 can also be designed as a combination of the individual embodiments shown in FIGS. 1 to 9. An umbrella-shaped head as in FIG. 9 in combination with an undercut as in FIG. 6 and a thickness reduction as in FIG. 8 would be conceivable. In this way it is possible through the multitude of influencing possibilities, with greatly varying constructive framework conditions, to adjust the pre-stressing force purposefully to a desired value.

Besides the round cross-sections of the rivet 12 and/or the opening 14 in the embodiments shown it is also possible to use other cross-sections. In particular four-cornered or multi-cornered cross-sections of the rivet shank 20 and/or the corresponding receiving opening 14 would be conceivable. The above indications concerning the diameters and the ratios set out for the concrete embodiments with round cross-sections then apply similarly to the value of the respective cross-section.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for non-releasable fixing of at least one component to a further component, the method comprising:
    introducing a hot rivet into an opening of the at least one component;
    welding an end face of a shank of the hot rivet to a surface of the further component; and
    subsequently compressing the shank of the hot rivet, with plastic deformation of the hot rivet, until a head of the hot rivet lies with a pre-stressing force at least in areas on a surface of the at least one component,
    wherein the pre-stressing force, with which the head of the hot rivet lies at least in areas on the surface of the at least one component, is adjusted to a predefined value, which is less than a maximum force, by one of
        adjusting a ratio of an inner diameter of a bearing surface of the head on a surface of the at least one component to a cross-sectional area of the shank;
        providing the shank with first and second length regions that are configured so that only one of the first and second length regions is compressed under plastic deformation;
        providing a thickness reduction in the further component on an area facing away from the shank; and
        configuring a lower side of the head in an umbrella shape so that the head is configured to contact the at least one first component only in an outer region.

* * * * *